Patented Jan. 13, 1931

1,788,466

UNITED STATES PATENT OFFICE

CORNELIS LOURENS, OF AMSTERDAM, NETHERLANDS, ASSIGNOR TO GENERAL NORIT COMPANY, LIMITED, OF AMSTERDAM, NETHERLANDS, A CORPORATION OF THE NETHERLANDS

PROCESS OF TREATING ACTIVE CARBONS FOR INCREASING THEIR ADSORBING EFFICIENCY

No Drawing. Application filed October 28, 1925, Serial No. 65,481, and in the Netherlands May 9, 1923.

This invention relates to improvements in active carbons and has among its objects the increasing of their adsorbing efficiency for certain purposes or of making it more suitable for certain uses. The present application is a continuation in part of my co-pending application, Serial No. 682,830, filed December 26, 1923.

It is known that the adsorbing action of active carbons (also called decolorizing or adsorbing carbons) in certain aqueous solutions, such as sugar solutions, is increased by slightly acidifying the liquids to be purified.

It is also known that active carbons are made more suitable for treatment of aqueous liquids of the same kind, by treating said carbons intensively with an aqueous solution of a strong acid, washing thereupon the excess of acid out of the carbon until neutral reaction of the wash water and leaving the carbon in wet condition to be used in this condition. It was found that carbon so treated may still contain very minute traces of acid absorbed on its surface. An analogous treatment with dilute acid may also be carried out only for the sake of freeing the carbon of its mineral constituents soluble in acid, whereas the excess of acid is washed out from the carbon as completely as possible together with the dissolved substances.

Now according to the present invention the active carbon, prepared in a previous operation by some known process, is treated with acid in such way that predetermined amount of acid is incorporated into the carbon and left therein. A separation of the mineral constituents of the carbon, dissolved by the acid, is not contemplated. The acid treatment may be carried out as well on a carbon which has been pretreated with the view of separating such mineral constituents, as on a carbon which has not been so pretreated, in which latter case the dissolved matters are left in the carbon.

The active carbons treated according to the invention are considered novel products of manufacture in the dry form when containing substantial quantities of acid, i. e. quantities greater than the traces which may remain absorbed after treating with an excess of an aqueous acid solution, separation and thorough washing of the wet acid carbon with water as heretofore practised for the removal of mineral or organic impurities or both. Carbons prepared in accordance with this invention when stirred up with water to a paste will color blue litmus red.

However, if starting from an alkaline reacting carbon, which is generally the case with the unextracted carbons produced by gas activation, the acid treatment may also be carried out until neutrality or until a certain reduction of the alkalinity has taken place, the new feature then consisting therein that the dissolved inorganic matters are not washed out but left in the carbon. If the carbon used contains a substantial amount of carbonates, viz. potassium, calcium or magnesium carbonates, and such carbon is treated according to the invention with hydrochloric acid, the product obtained will be recognizable by its substantial contents of the corresponding soluble chlorides.

The active carbons prepared according to the present invention have been found of considerable value for several technical uses. It was known that active carbons heretofore used and not treated according to the present invention, viz. such carbons having a considerable decolorizing capacity for sugar solutions and other aqueous liquids, gave, in many cases, unsatisfactory results if applied in the ordinary way on oils, fats or other non-aqueous liquids, their bleaching power being even inferior to that of a good bleaching earth as fuller's earth. Now I have found, that many oils and fats are much more efficaciously bleached, if treated with a carbon containing a predetermined amount of free acid. This acid content may range from 0.3 to 5.0% calculated on the weight of the carbon.

A further application of the acidulated carbons is for the sterilization of water and other liquids, owing to the fact that the carbon treated according to the invention is, and remains sterile in itself, and if used as filtering agent, it gives during several weeks an absolutely or substantially sterile water, while the acid contained in the carbon is carried away by the first batches of liquid treated.

The process is applicable to every active carbon, it being immaterial whether the carbon was prepared from carbonaceous material by the aid of activating gases or of added solid or liquid substances at high temperature, or by chemical carbonization of the raw material by means of dehydrating or carbonizing chemicals, such as zinc chloride, sulphuric acid, etc. or by any other activating process. As stated above, the acid treatment may be applied either on the raw carbon as produced or on the carbon pretreated for the purpose of removing its ash contents. The acid treatment may also be applied to revivified carbons.

In an analogous way the invention comprises the treatment of mixtures of active carbon with other absorbing agents, for example, mixtures of active carbon and bleaching earths, such as are used for the bleaching or decolorizing of oils and fats, for example fuller's earth.

Suitable acids for rendering the carbons or mixtures acid are hydrochloric acid, sulphuric acid, nitric acid, acetic acid, phosphoric acid, tartaric acid and sulphur dioxide, but other acids may be employed. Usually the best results are obtained by the use of volatile acids, especially of hydrochloric acid, but the choice of acid depends on the nature and previous treatment of the material to be treated. Due to the catalytic action of the carbon, sulphur dioxide will in many cases be changed into sulphuric acid. Also if carbon be impregnated with chlorine, this latter may be owing to a catalytic process occurring very rapidly in presence of sufficient moisture converted into hydrochloric acid. Active carbons, or mixtures of active carbons and other absorbents containing at least 2% of soluble chlorides, calculated on the carbons, have been found very efficient for the uses stated.

The process of incorporating the acid in the active carbon may be performed in several ways. In one method the carbon is treated with a predetermined amount of acid in aqueous solution so as to produce the desired degree of acidity in the carbon. This treatment may be carried out by stirring the carbon in a mixing vessel with the acid solution, or this latter may be sprayed or atomized on or into the material. In this way a substantial amount of water is brought into the carbon, which in many cases it will be required to remove by subsequent desiccation of the carbon, although in other cases this humidity may be left in the carbon and the carbon so prepared used directly in wet or pasty condition.

In another method the acid is not mixed with the carbon in aqueous solution, but fed to the carbon in gaseous form and the acid is directly fixed by adsorption in the carbon. The volatile acid may be dried or not before use. In the same way acids which are not volatile at ordinary temperatures may be introduced into the carbon in vapor form at a temperature sufficiently elevated to produce vapor of such acids. The use of gaseous acid avoids loss in acid and the inconvenience which results from handling an acid liquid; it results in a uniform impregnation of the acid in the carbon and this latter is directly ready for use without subsequent drying.

Good results are obtained by treating active carbon obtained by gas activation of material of vegetable origin, which product possesses a fibrous or needle-like structure. A preferred procedure is to treat the active carbon with hydrochloric acid in gaseous form as it is cooling down after the activating process is completed or when it is cold and without employing an intermediate treatment other than grinding.

If the carbon is obtained in the form of lumps or granules it may be treated either in a continuous or discontinuous process with a calculated quantity of acid either in the gaseous or in a dissolved or liquid state, dried if required, and ground or employed in the lump form. Alternatively, the material may be first ground and then treated either as such or mixed with one or more other adsorbents with acid.

In preparing acid mixtures of active carbon with other adsorbents according to the invention the acid treatment may be carried out either before, during or after the mixing operation.

What I claim is:

1. The process of forming an active carbon containing an acid which comprises bringing active carbon in contact with a gaseous medium capable of placing an acid within the active carbon and adjusting the amount of acid within the active carbon so that substantially not more than from 0.3 to 5.0% of acid is retained by the final carbon product and that the amount of acid present in the final carbon product exceeds mere traces.

2. Active decolorizing carbon containing at least 0.3% of free acid.

3. Active carbon containing from 0.3 to 5.0% acid.

4. The process of preparing activated carbon containing acid which comprises treating activated carbon with an acid in such amount that the final product of the process contains a substantial amount of acid and at least in excess of mere traces.

5. The process of preparing active carbon containing acid which comprises contacting activated carbon with an acid reacting material in the form of a fluid medium, thereby permitting the active carbon to absorb said acid material, and arresting the process when the activated carbon contains from 0.3 to 5.0% acid.

6. The process of preparing activated carbon containing acid which comprises treating activated carbon with an acid under conditions permitting the absorption of acid by the activated carbon and collecting the acid containing carbon as a final product when its acid content is substantially in excess of mere traces and sufficient in amount to color blue litmus red when placed in water.

7. The process of preparing activated carbon containing acid which comprises treating activated carbon with a mineral acid under conditions permitting the absorption of acid by the activated carbon and collecting the acid containing carbon as a final product when its acid content is substantially in excess of mere traces and at least sufficient in amount to color blue litmus red when placed in water.

8. The process of preparing activated carbon containing acid which comprises contacting said carbon with a fluid acid medium thereby causing the activated carbon to absorb acid and collecting the acid carbon as a final product for treatment of fluids when its acid content is from about 0.3 to 5.0% acid.

In testimony whereof I affix my signature.

CORNELIS LOURENS.